United States Patent
Li et al.

(10) Patent No.: US 12,185,350 B2
(45) Date of Patent: Dec. 31, 2024

(54) UPLINK CONTROL INFORMATION TRANSMISSION METHOD, TERMINAL DEVICE, AND STORAGE MEDIUM

(71) Applicant: VIVO MOBILE COMMUNICATION CO., LTD., Guangdong (CN)

(72) Inventors: Na Li, Guangdong (CN); Xueming Pan, Guangdong (CN); Xiaodong Shen, Guangdong (CN); Zhi Lu, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 425 days.

(21) Appl. No.: 17/584,171

(22) Filed: Jan. 25, 2022

(65) Prior Publication Data
US 2022/0150912 A1 May 12, 2022

Related U.S. Application Data

(63) Continuation of application No. PCT/CN2020/105676, filed on Jul. 30, 2020.

(30) Foreign Application Priority Data

Jul. 30, 2019 (CN) .......................... 201910693015.3

(51) Int. Cl.
*H04W 72/542* (2023.01)
*H04L 1/00* (2006.01)
(Continued)

(52) U.S. Cl.
CPC .......... *H04W 72/542* (2023.01); *H04L 1/0068* (2013.01); *H04W 72/1268* (2013.01); *H04W 72/569* (2023.01)

(58) Field of Classification Search
CPC .......... H04W 72/542; H04W 72/1268; H04W 72/569; H04W 72/21; H04W 72/54;
(Continued)

(56) References Cited

U.S. PATENT DOCUMENTS

| 10,568,074 B2 | 2/2020 | Seo et al. |
|---|---|---|
| 2013/0100911 A1 | 4/2013 | Lv et al. |

(Continued)

FOREIGN PATENT DOCUMENTS

| CN | 109995485 A | 7/2019 |
|---|---|---|
| CN | 109996337 A | 7/2019 |

(Continued)

OTHER PUBLICATIONS

Remaining issues on CSI-RS design, 3GPP TSG RAN WG1 Meeting #92bis, Apr. 16-Apr. 20, 2018, R1-1805108, Nokia, Nokia Shanghai Bell, Sanya, P.R. China.

(Continued)

*Primary Examiner* — Dinh Nguyen
(74) *Attorney, Agent, or Firm* — IP & T GROUP LLP (57) ABSTRACT

An uplink control information transmission method includes: in a case that a PUCCH resource carrying CSI and a PUCCH resource corresponding to an SR overlap in time domain, determining a state of an SR; and in a case that at least one SR is in a positive state, skipping transmitting the CSI, and transmitting an SR in the positive state on the PUCCH resource corresponding to the SR in the positive state; or transmitting the SR in the positive state by puncturing the PUCCH resource of the CSI.

20 Claims, 4 Drawing Sheets

(51) Int. Cl.
*H04W 72/1268* (2023.01)
*H04W 72/566* (2023.01)

(58) Field of Classification Search
CPC .... H04W 72/56; H04L 1/0068; H04L 1/0072; H04L 5/0064; H04L 5/0053; H04L 5/0007; H04L 5/0057
See application file for complete search history.

(56) References Cited

U.S. PATENT DOCUMENTS

| | | | |
|---|---|---|---|
| 2016/0302186 A1 | 10/2016 | Lv et al. | |
| 2018/0084543 A1 | 3/2018 | Lv et al. | |
| 2018/0199336 A1* | 7/2018 | Han | H04W 72/21 |
| 2019/0261391 A1* | 8/2019 | Kundu | H04L 1/0073 |
| 2020/0145988 A1* | 5/2020 | Seo | H04L 1/1861 |
| 2020/0337046 A1 | 10/2020 | Gao et al. | |
| 2020/0344788 A1 | 10/2020 | Li et al. | |
| 2020/0344789 A1 | 10/2020 | Gao | |
| 2022/0264623 A1* | 8/2022 | Yin | H04W 72/56 |

FOREIGN PATENT DOCUMENTS

| | | |
|---|---|---|
| CN | 110035535 A | 7/2019 |
| JP | 2015512174 A | 4/2015 |
| WO | 2019/137503 A1 | 7/2019 |

OTHER PUBLICATIONS

The First Office Action of Priority Application No. CN 201910693015.3 issued by the Chinese Patent Office on Jul. 6, 2021.
International Search Report and Written Opinion of International Application No. PCT/CN2020/105676 issued by the Chinese Patent Office on Oct. 28, 2020.
Notice of Reasons for Refusal issued by the JPO for Japanese Patent Application No. 2022-506297, mailed on Dec. 27, 2022.
Decision of Refusal issued by the JPO for Japanese Patent Application No. 2022-506297, mailed on May 2, 2023.
OPPO,Summary#2 on UCI enhancements for URLLC[online], 3GPP TSG RAN WG1#97,3GPP,2019.
Vivo,UCI enhancements for URLLC[online], 3GPP TSG RAN WG1#97,3GPP,2019On Jan. 17, 2005 : R 1 to R 1907777, Dec. 2022.
Office Action issued by the Indian Patent Office for Application No. 202227005128 mailed on Jun. 22, 2022.
EESR issued by the EPO for Application No. EP20847503 dated Jul. 11, 2022.
ZTE, "Discussion on intra-UEmultiplexing",3GPP Draft; 3rd GenerationPartnership Project (3GPP), Feb. 2019.
Panasonic, "Discussion on partial overlap 1-15between HARQ—,ACK and SR",3GPP Draft; 3rd GenerationPartnership Project (3GPP), Apr. 2018.
CATT, "On UCI multiplexing on PUC CH", 3GPP Draft; 3rd Generation PartnershipProject (3GPP), May 2018.
ZTE, "UL control enhancements for NRURLLC",3GPP Draft; 3rd GenerationPartnership Project (3GPP), May 2019.
Office Action for the Korean Patent Application No. 10-2022-7006282 issued by the Korean Intellectual Property Office on Jul. 17, 2024.
Huawei et al., R1-1811970, Review Summary for AI 7.1.3.2 related to long PUCCH, 3GPP TSG RAN WG1 #94bis, Sep. 8-12, 2018, 3GPP, Chengdu, China.
Reconsideration Report by Examiner before Appeal for the Japanese Patent Application No. 2022-506297 issued by the Japanese Patent Office on Dec. 5, 2023.

* cited by examiner

UPLINK CONTROL INFORMATION TRANSMISSION METHOD, TERMINAL DEVICE, AND STORAGE MEDIUM

CROSS-REFERENCE TO RELATED APPLICATIONS

This application is a Bypass Continuation Application of PCT/CN2020/105676 filed on Jul. 30, 2020, which claims priority to Chinese Patent Application No. 201910693015.3 filed on Jul. 30, 2019, which are incorporated herein by reference in their entirety.

TECHNICAL FIELD

Embodiments of the present disclosure relate to the field of communications technologies, and in particular, to an uplink control information transmission method, a terminal device, and a storage medium.

BACKGROUND

With the rapid development of mobile communications, the requirements for reliability, latency, bandwidth and coverage of the mobile communications are increasingly high. A terminal device, such as a user equipment (UE), may support different types of services. For example, the UE may support not only an ultra-reliable and low latency communications (URLLC) service, but also an enhanced mobile broadband (eMBB) service.

SUMMARY

Embodiments of the present disclosure provide an uplink control information transmission method, a terminal device, and a storage medium.

According to a first aspect, an embodiment of the present disclosure provides an uplink control information transmission method, applied to a terminal device and including: in a case that a time domain resource of a physical uplink control channel (PUCCH) carrying channel state information (CSI) and a time domain resource of a PUCCH corresponding to a scheduling request (SR) overlap, determining a state of the SR; and in a case that the state of at least one SR is positive, performing the following processing: skipping transmitting the CSI, and transmitting an SR whose state is positive on the resource of the PUCCH corresponding to the SR whose state is positive; or transmitting the SR whose state is positive by puncturing the resource of the PUCCH of the CSI.

According to a second aspect, an embodiment of the present disclosure further provides a terminal device, including: a state determining module, configured to: in a case that a time domain resource of a PUCCH carrying CSI and a time domain resource of a PUCCH corresponding to an SR overlap, determine a state of the SR; and a transmission module, configured to: in a case that the state of at least one SR is positive, perform the following processing: skipping transmitting the CSI, and transmitting an SR whose state is positive on the resource of the PUCCH corresponding to the SR whose state is positive; or transmitting the SR whose state is positive by puncturing the resource of the PUCCH of the CSI.

According to a third aspect, an embodiment of the present disclosure provides a terminal device, including a processor, a memory, and a program or instruction stored in the memory and executable on the processor, where when the program or instruction is executed by the processor, the steps of the uplink control information transmission method in the foregoing technical solution are implemented.

According to a fourth aspect, an embodiment of the present disclosure provides a non-transitory computer-readable storage medium, where the non-transitory computer-readable storage medium stores a computer program, and when the computer program is executed by the processor, the steps of the uplink control information transmission method in the foregoing technical solution are implemented.

BRIEF DESCRIPTION OF DRAWINGS

It may be better understood from the following descriptions of description of embodiments of the present disclosure with reference to the accompanying drawings. Same or similar reference numerals indicate same or similar features.

DETAILED DESCRIPTION OF EMBODIMENTS

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

A UE may support different types of services. For example, the UE may support not only a URLLC service, but also an eMBB service. Different channels in a communication system may have different start symbols and lengths, and therefore timing sequences used to transmit resources may be overlapped.

For example, in a case that a time domain resource occupied by an SR and a time domain resource occupied by CSI overlap, the SR will be multiplexed on the time domain resource of the CSI for transmission. In a case that the symbol length of a PUCCH of the CSI is longer than the symbol length of a PUCCH of the SR, it is necessary to receive the PUCCH of the entire CSI to obtain the SR via decoding, resulting in an increase of transmission latency of the SR.

Embodiments of the present disclosure provide an uplink control information transmission method, a terminal device, and a storage medium, which may be applied to a scenario where the terminal device transmits uplink control information to a network side. The uplink control information may include a hybrid automatic repeat request acknowledgment (HARQ-ACK), an SR and CSI. The uplink control information is mainly carried on a resource of a PUCCH for transmission. In a case that a time domain resource of a PUCCH carrying CSI and a time domain resource of a PUCCH corresponding to an SR overlap, by adopting the uplink control information transmission method in the embodiment of the present disclosure, it is no longer necessary to multiplex and transmit the SR and the CSI on the resource of the PUCCH of the CSI. Therefore, an increase of transmission latency of the SR with a higher latency requirement is avoided. The terminal device may be a UE or other terminal devices, which is not limited herein. For ease of description, the following uses the UE as an example for description.

Figure 1:
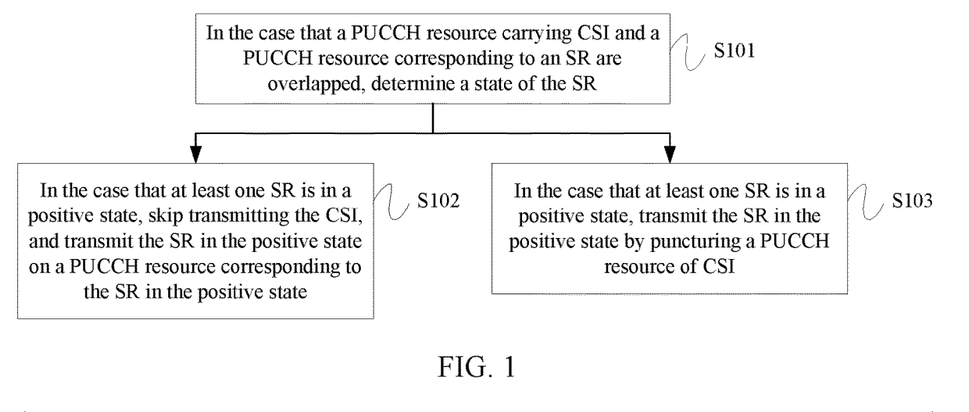
FIG. 1 is a flowchart of an uplink control information transmission method according to an embodiment of the present disclosure.

FIG. 1 is a flowchart of an uplink control information transmission method according to an embodiment of the present disclosure. The uplink control information transmission method may be performed by the terminal device, such as UE. As shown in FIG. 1, the uplink control information transmission method may include step S101, and at least one of step S102 and step S103.

In step S101, in a case that a time domain resource of a PUCCH carrying CSI and a time domain resource of a PUCCH corresponding to an SR overlap, a state of the SR is determined.

In a case that no uplink data needs to be transmitted, in order to avoid the waste of resources, a base station on a network side does not need to allocate uplink resources for UE. Therefore, the UE notifies the base station, through the SR, whether the uplink resources need to be allocated for uplink shared channel (UL-SCH) transmission. The SR is transmitted on a corresponding PUCCH resource.

Figure 2:
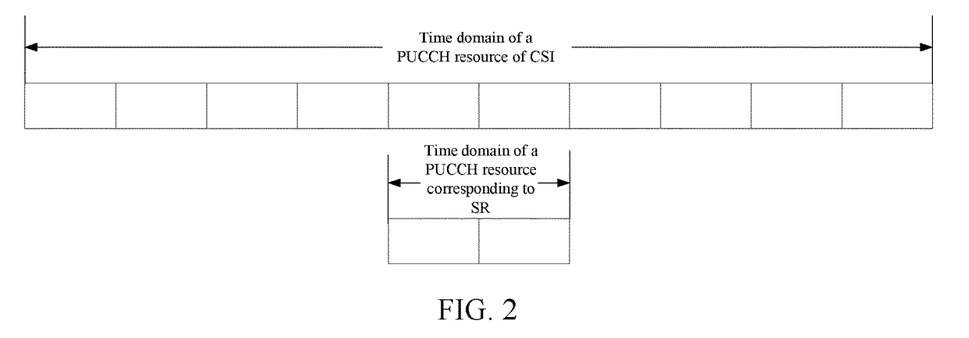
FIG. 2 is a schematic diagram of a scenario of an example in which a PUCCH resource of CSI and a PUCCH resource corresponding to an SR overlap in time domain according to an embodiment of the present disclosure.
Figure 3:
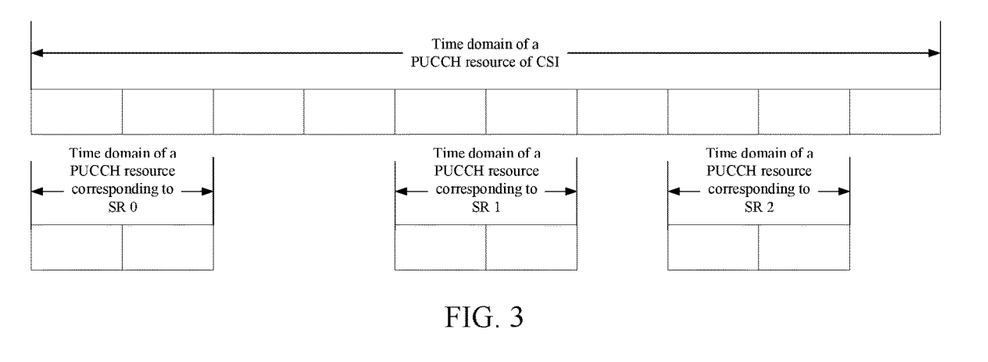
FIG. 3 is a schematic diagram of a scenario of another example in which a PUCCH resource of CSI and a PUCCH resource corresponding to an SR overlap in time domain according to an embodiment of the present disclosure.

There may be one or more SRs of which PUCCH resources overlap in time domain with PUCCH resource carrying CSI. For example, FIG. 2 is a schematic diagram of a scenario of an example in which a PUCCH resource of CSI and a PUCCH resource corresponding to an SR overlap in time domain according to an embodiment of the present disclosure. As shown in FIG. 2, each square indicates an orthogonal frequency division multiplex (OFDM) symbol. The time domain length of the resource of the PUCCH carrying the CSI is ten OFDM symbols. The time domain length of the resource of the PUCCH corresponding to one SR is two OFDM symbols. The PUCCH resource carrying the CSI and the PUCCH resource corresponding to the SR overlap in time domain. For another example, FIG. 3 is a schematic diagram of a scenario of another example in which a PUCCH resource of CSI and a PUCCH resource corresponding to an SR overlap in a time domain according to an embodiment of the present disclosure. As shown in FIG. 3, each square indicates one OFDM symbol. The time domain length of the resource of the PUCCH carrying the CSI is ten OFDM symbols. An SR 0, an SR 1 and an SR 2 correspond to different configurations of SRs, and the time domain lengths of their corresponding PUCCH resources are all two OFDM symbols. The PUCCH resource carrying the CSI and the PUCCH resources corresponding to the configurations of the three SRs (that is, SR 0, SR 1 and SR 2) overlap in the time domain.

Figure 4:
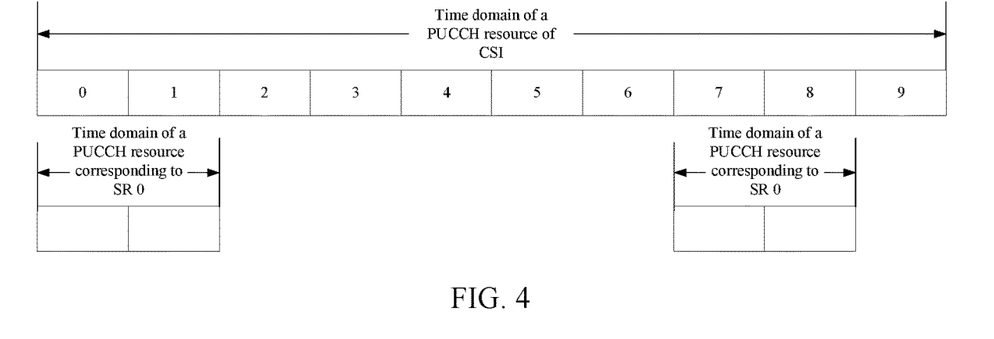
FIG. 4 is a schematic diagram of a scenario of still another example in which a PUCCH resource of CSI and a PUCCH resource corresponding to an SR overlap in time domain according to an embodiment of the present disclosure.

Herein, the number of the SRs of which PUCCH resources overlap with the PUCCH resource of the CSI refers to the number of configurations of the SRs of which the PUCCH resources overlap with the PUCCH resource of the CSI, rather than the number of the resources of the PUCCHs corresponding to the SRs. FIG. 4 is a schematic diagram of a scenario of still another example in which a PUCCH resource of CSI and a PUCCH resource corresponding to an SR overlap in the time domain according to an embodiment of the present disclosure. As shown in FIG. 4, the time domain length of the resource of the PUCCH of the CSI is ten OFDM symbols, with a start symbol of an OFDM symbol 0, the period of an SR 0 is seven OFDM symbols, and the time domain length of a resource of a PUCCH corresponding to the SR 0 is two OFDM symbols, with a start symbol of an OFDM symbol 07. Therefore, within one slot, the SR 0 has two PUCCH transmission opportunities, whose start symbols are the OFDM symbol 0 and the OFDM symbol 7, respectively. At this time, the PUCCHs of the CSI and the two PUCCH transmission opportunities of the SR 0 are subjected to resource overlap, but the number of SRs overlapped with the resources of the PUCCHs of the CSI is 1.

The state of an SR includes a positive state (i.e., a positive state) or a negative state (i.e., a negative state). The SR whose state is positive indicates that the UE requests uplink resources. The SR whose state is negative indicates that the UE does not request uplink resources.

In step S102, in a case that the state of at least one SR is positive, CSI is not transmitted, and the SR whose state is positive is transmitted on a resource of a PUCCH corresponding to the SR in the positive state.

The number of configurations of SRs of which PUCCH resources overlap with the PUCCH resource carrying the CSI in the time domain may be one or more.

In some examples, the number of configurations of SRs of which PUCCH resources overlap with PUCCH resource carrying CSI in time domain is one. In a case that the state of this SR of which a time domain resource of a PUCCH is overlapped with a time domain resource of a PUCCH carrying CSI is positive, the CSI is not transmitted by UE, and the SR is transmitted on the resource of the PUCCH corresponding to the SR.

In some other examples, the number of configurations of SRs of which PUCCH resources overlap with PUCCH resource carrying CSI in the time domain is more (i.e., two or more), and the resources of the PUCCH corresponding to the more SRs may be overlapped or not overlapped. In a case that the state of at least one SR of which a time domain resource of a PUCCH is overlapped with a time domain resource of a PUCCH carrying CSI is positive, the CSI is not transmitted by UE, but one or more SRs whose states are positive are transmitted on the resources of the PUCCHs corresponding to the SRs whose states are positive. The number of configurations of the positive SRs of which the PUCCH resources overlap with the PUCCH resource carrying the CSI in the time domain can be one or more. In a case that the number of configurations of the positive SRs of which PUCCH resources overlap with PUCCH resource carrying CSI in time domain is more, and the resources of the PUCCHs corresponding to the more SRs are overlapped, the UE can determine which SR whose state is positive is transmitted. In a case that the resources of the PUCCHs corresponding to the more SRs are not overlapped, the UE can transmit respective positive SRs on their own PUCCH resources of the SRs. Optionally, in a case that the UE is unable to transmit more SRs of which the resources are not overlapped within one time unit due to certain limitations, the UE can determine or a protocol can which SR in the positive state is transmitted.

It should be noted that, the skipping transmitting the CSI herein refers to skipping transmitting the CSI and the PUCCH carrying the CSI. The resource overlap herein refers to time domain overlap, which may be partial overlap or complete overlap.

In some embodiments, when the UE does not start to transmit the PUCCH carrying the CSI or does not start to process the CSI, in a case that the SR overlapped with the PUCCH resource carrying the CSI is in a positive state, the UE does not transmit the PUCCH of the CSI, and transmits only the PUCCH of the SR.

Alternatively, in some other embodiments, when the UE starts to transmit the PUCCH carrying the CSI or process the CSI, in a case that all the SRs which overlap with the PUCCH resources carrying the CSI are in a negative state, the UE starts to transmit the PUCCHs carrying the CSI or process the CSI. In the process of the UE transmitting the PUCCH carrying the CSI or processing the CSI, in a case that the state of at least one SR overlapped with the PUCCH resources carrying the CSI changes to positive, the UE stops transmitting the PUCCH carrying CSI or processing the CSI. Optionally, the UE may start to stop transmitting the PUCCH carrying the CSI and to transmit the PUCCH of the SR from a position corresponding to the start symbol of the PUCCH of the SR in the positive state, and no longer continue to transmit the stopped PUCCH carrying the CSI after the transmission of the SR is completed. Alternatively, the UE does not start to transmit the PUCCH carrying the CSI. Alternatively, the UE may start to stop transmitting the PUCCH carrying the CSI and to transmit the PUCCH of the SR from a position corresponding to the start symbol of the PUCCH of the SR in the positive state, and continue to transmit the remaining part after the resource overlap of the stopped PUCCH carrying the CSI after the transmission of the SR is completed.

Because the UE does not transmit the CSI, the SR in the positive state is transmitted on the PUCCH resource corresponding to the SR in the positive state. Therefore, upon receiving the SR, the network side can detect the SR. Compared with a method of multiplexing and transmitting an SR and CSI on a PUCCH resource of the CSI, it is not necessary to receive a PUCCH of the entire CSI to obtain the SR via decoding, so as to shorten the transmission latency of the SR. In particular, in a case that the symbol length of the PUCCH resource corresponding to the SR is short and that of the PUCCH resource carrying the CSI is long, the transmission latency of the SR can be significantly shortened.

In step S103, in a case that at least one SR is in a positive state, the SR in the positive state is transmitted by puncturing the PUCCH resource of the CSI.

According to some embodiments, an SR in a positive state may also be transmitted by puncturing a PUCCH resource of CSI. For example, puncturing is performed at a specific resource element (RE) position of the PUCCH resource of the CSI for transmission. For example, SR information is transmitted by puncturing a specific number of resource elements from a symbol position corresponding to the start symbol of the PUCCH of the SR. Alternatively, SR information is transmitted by puncturing a specific number of REs from the first column behind a demodulation reference signal (DMRS) OFDM symbol of the PUCCH of the CSI closest to the start symbol of the PUCCH of the SR. The punctured RE can be obtained according to a predetermined rule based on the bit length of the SR information. Therefore, the SR in the positive state is transmitted to a preset position on the PUCCH resource carrying the CSI. In a case that the number of configurations of the SRs of which the PUCCH resources overlap with the PUCCH resources of the CSI in time domain is N, and N is a positive integer, the information bit length of the SRs transmitted by puncturing the PUCCH resources of the CSI is $\log_2 N$ bits. That is, the SR information with the bit length of $\log_2 N$ bits is transmitted by puncturing the PUCCH resource of the CSI. Optionally, different states of the information with the bit length of $\log_2 N$ bits may indicate which SR among the N configurations of SRs is in the positive state. For example, N equals 2, indicating that the PUCCH resources corresponding to two SRs are configured to be overlapped with the PUCCH resources of the CSI in time domain. In this case, 1-bit SR information may be transmitted by puncturing. When the state of the bit information is set to 0, it may indicate that among the SRs of which the PUCCH resources overlap with the PUCCH resource of the CSI in time domain, the SR in the positive state is a first SR. When the state of the bit information is set to 1, it may indicate that among the SRs of which the PUCCH resources overlap with the PUCCH resource of the CSI in time domain, the SR in the positive state is a second SR.

According to some another embodiments, an SR in the positive state may also be transmitted by puncturing a PUCCH resource of CSI. It may also indicate that the UE transmits the CSI and the SR through rate matching, that is, a specific number and location of REs are reserved on the PUCCH of the CSI to transmit the SR. In a case that the UE performs rate matching and resource mapping on the CSI, CSI information cannot be mapped to these reserved REs. Then regardless of whether the SR is in the positive state or the negative state, the UE will transmit the corresponding information indicating the SR state on the PUCCH resource of the CSI.

According to some other embodiments, an SR in a positive state is transmitted by puncturing a PUCCH resource of CSI, or a PUCCH carrying CSI is punctured and transmitted at a symbol position corresponding to a PUCCH of an SR in a positive state by UE. That is, the UE does not transmit the PUCCH of the CSI, and transmits the PUCCH of the SR in the positive state in an overlapping part with the PUCCH of the SR in the positive state, or transmits the PUCCH of the SR in the positive state on a physical resource block (PRB) of the PUCCH of the CSI in an overlapping part with the PUCCH of the SR in the positive state, where the specific PRB may be a starting PRB or a last PRB of the PUCCH carrying the CSI. Alternatively, the UE does not transmit the PUCCH of the CSI, and transmits the PUCCH of the SR on the PUCCH resource of the SR at the symbol position of the PUCCH resource corresponding to the SR.

In a case that the number of configurations of the positive state SRs of which PUCCH resources overlap with PUCCH resource of the CSI in time domain is more, one of the SRs in the positive state is transmitted by puncturing the PUCCH resources carrying the CSI. The UE may determine which SR in the positive state is transmitted.

Figure 5:
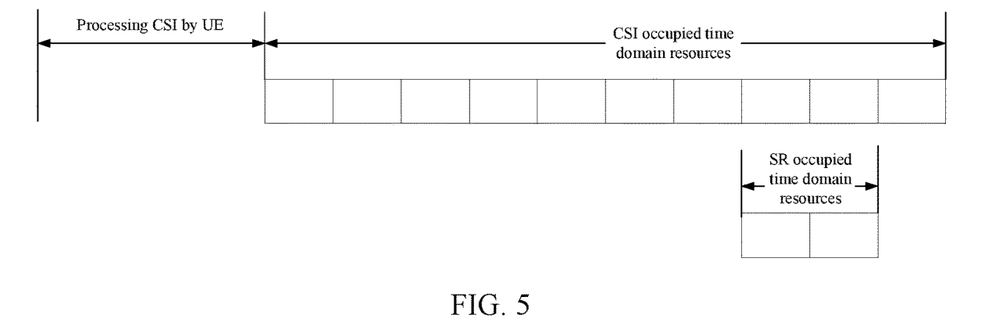
FIG. 5 is a schematic diagram of a scenario of yet another example in which a PUCCH resource of CSI and a PUCCH resource corresponding to an SR overlap in time domain according to an embodiment of the present disclosure.

According to the foregoing embodiments, the positive state of the SR includes the case where the SR is changed from the negative state to the positive state. For example, FIG. 5 is a schematic diagram of a scenario of yet another example in which a PUCCH resource of CSI and a PUCCH resource corresponding to an SR overlap in time domain according to an embodiment of the present disclosure. As shown in FIG. 5, the symbol length of the PUCCH resource of the CSI is long, which is ten OFDM symbols. The symbol length of the PUCCH resource corresponding to the SR is short, which is two OFDM symbols. Before the start symbol of the PUCCH resource of the CSI, the UE processes the CSI first, such as coding, modulation, rate matching, and the like. In a case that a medium access control (MAC) layer has not indicated that an SR on a physical layer is in a positive state before the UE starts to process the CSI, the SR is in a negative state. However, it is possible that in the process of the UE processing the CSI, or in the process of the UE transmitting the CSI on the PUCCH resource of the CSI, the MAC layer indicates that the SR on the physical layer is in a positive state, which is equivalent to that the SR is changed from a negative state to a positive state, and then the UE stops processing the CSI or stops transmitting the CSI. The SR in the positive state is transmitted on the PUCCH resource corresponding to the SR in the positive state, or the SR in the positive state is transmitted by puncturing the PUCCH resource of the CSI. It is worth mentioning that, in a case that the UE has started to transmit the CSI on the PUCCH resource of the CSI, since the coding and resource mapping of CSI has been completed, it is more suitable to adopt a mode of transmitting the SR in the positive state by puncturing the PUCCH resource of the CSI.

According to the embodiments of the present disclosure, in a case that the PUCCH resource carrying the CSI and the PUCCH resource corresponding to the SR overlap in time domain, and at least one SR is in the positive state, the CSI is not transmitted, and the SR in the positive state is transmitted on the PUCCH resource corresponding to the SR in the positive state; or the SR in the positive state is transmitted by puncturing the PUCCH resource of the CSI. It is no longer necessary to multiplex and transmit the SR and the CSI on the PUCCH resource of the CSI to ensure that a network side may receive the SR, that is, decoding or detecting the SR, it is not necessary to receive entire PUCCH of the CSI to obtain the SR via decoding, so as to shorten the transmission latency of the SR and improve the transmission reliability of the SR.

In the foregoing transmission process, in a case that the PUCCH resource of the CSI and the PUCCH resource of the SR overlap, since the UE may decide not to transmit the PUCCH of the CSI, and transmit the PUCCH of the SR or transmit the SR by puncturing the PUCCH resource of the CSI before the transmission of the CSI starts or after the transmission of the CSI has started. A device on the network side is required to detect the PUCCH of the SR or whether the SR information is sent while receiving the PUCCH of the CSI, so as to detect or decode the SR information in time.

Figure 6:
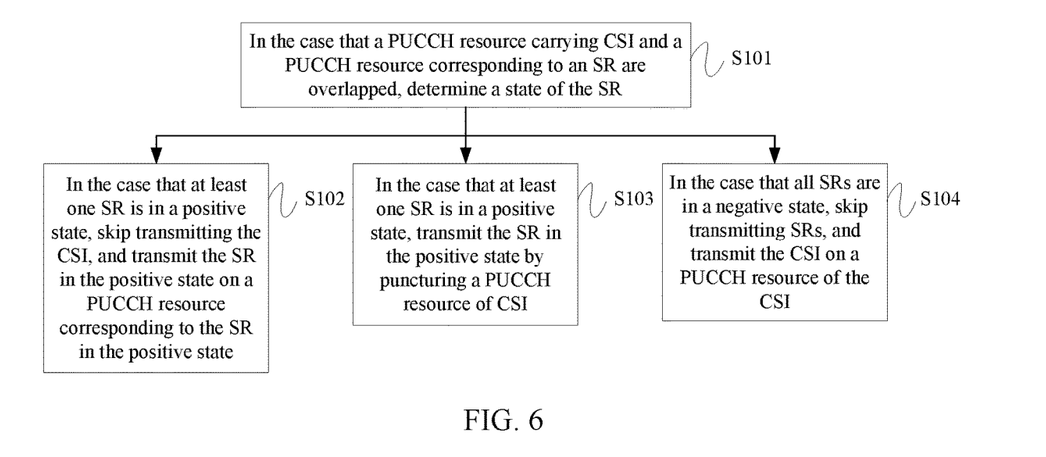
FIG. 6 is a flowchart of an uplink control information transmission method according to another embodiment of the present disclosure.

FIG. 6 is a flowchart of an uplink control information transmission method according to another embodiment of the present disclosure. The difference between FIG. 6 and FIG. 1 is that the uplink control information transmission method shown in FIG. 6 can further include step S104.

In step S104, in a case that all SRs are in a negative state, the SRs are not transmitted, and CSI is transmitted on a PUCCH resource of the CSI.

In a case that the PUCCH resource carrying the CSI and a PUCCH resource corresponding to an SR overlap in time domain, and the SR is in a negative state, it indicates that UE does not request uplink resources. Therefore, the SR may not be transmitted, and the CSI is transmitted on the PUCCH resource of the CSI to reduce the influence of the SR transmission on the CSI.

Figure 7:
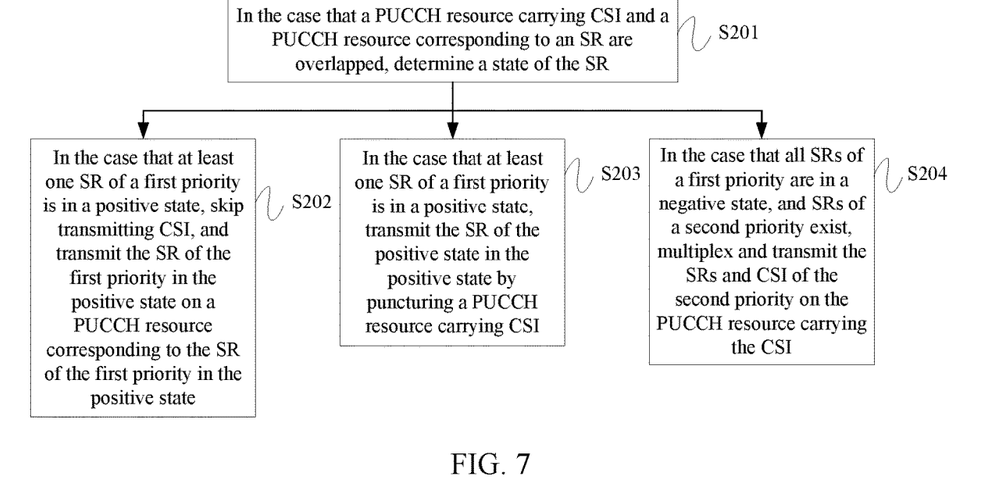
FIG. 7 is a flowchart of an uplink control information transmission method according to still another embodiment of the present disclosure.

In some embodiments, priorities can be configured for SRs such that the SRs have the priorities. Optionally, the priorities may include a first priority and a second priority. The first priority is higher than the second priority, that is, in comparison, the first priority is a high priority and the second priority is a low priority. It should be noted that, each of the first priority and the second priority may be subdivided into a plurality of priorities, and the priority belonging to the first priority is higher than the priority belonging to the second priority. Accordingly, FIG. 7 is a flowchart of an uplink control information transmission method according to still another embodiment of the present disclosure. As shown in FIG. 7, the uplink control information transmission method may include step S201, at least one of step S202 and step S203, and step S204.

In step S201, in a case that a PUCCH resource carrying CSI and a PUCCH resource corresponding to an SR overlap in time domain, a state of the SR is determined.

Step S201 may refer to the related description of step S101 in the foregoing embodiment. Details are not described herein again.

In step S202, in a case that the at least one SR of a first priority is in a positive state, CSI is not transmitted, and the SR of the first priority in the positive state is transmitted on a PUCCH resource corresponding to the SR of the first priority in the positive state.

According to the embodiment, SRs of which PUCCH resources overlap with PUCCH resource of CSI may include an SR of a first priority and an SR of a second priority. In a case that the at least one SR of a first priority is in a positive state, the CSI is not transmitted by UE, and the SR of the first priority in the positive state is transmitted on a PUCCH resource corresponding to the SR of the first priority in the positive state. It should be noted that, in a case that the number of configurations of the SRs of the first priority in the positive state is more, the UE determines which SR in the positive state is transmitted.

In step S203, in a case that at least one SR of a first priority is in a positive state, the SR of the first priority in the positive state is transmitted by puncturing a PUCCH resource of CSI.

Similar to step S202, the SRs of which PUCCH resources overlap with the PUCCH resource carrying the CSI in time domain can include an SR of a first priority and an SR of a second priority. In a case that at least one of the SRs of the first priority is in the positive state, one of the SRs of the first priority in the positive state is transmitted by puncturing the PUCCH resource of the CSI. In a case that the number of configurations of the SRs of the first priority in the positive state is more, the UE determines which SR in the positive state is transmitted.

In step S204, in a case that all SRs of a first priority are in a negative state, and SRs of a second priority exist, the SRs of the second priority and CSI are multiplexed and transmitted on a PUCCH resource of the CSI.

Optionally, in some examples, in a case that all SRs of a first priority is in a negative state, and the SRs of which PUCCH resources overlap with PUCCH resource carrying CSI in time domain also include SRs of the second priority, the UE multiplexes and transmits the SRs and the CSI of the second priority on the PUCCH resources of the CSI. In some examples, SR information bits of SRs of a second priority may be placed before the CSI information bits of CSI, then subjected to coding, modulation, and the like, and transmitted on a PUCCH resource carrying the CSI. For ease of description, in a case that the number of configurations of the SRs of the second priority is set to M, and M is a positive integer, the information bit length of the SRs of the second priority multiplexed and transmitted on the PUCCH resource of the CSI is $\log_2(1+M)$ bits.

Optionally, in some another examples, in a case that all SRs of a first priority is in a negative state, and the SRs of which PUCCH resources overlap with PUCCH resource carrying CSI in time domain also include SRs of a second priority, the UE multiplexes and transmits the SRs and the CSI of the second priority on the PUCCH resources of the CSI. In a case that the total number of configurations of the SRs of the first priority and the second priority is set to M, and M is a positive integer, the information bit length of the SRs of the second priority multiplexed and transmitted on the PUCCH resources of the CSI is $\log_2(1+M)$ bits.

The first priority and the second priority in the foregoing embodiments may be both configured directly or indirectly by radio resource control (RRC), or may be configured in other ways, which is not limited herein.

The priority of the SR can be determined based on the period of the SR. For example, the SR of which the period is less than a period threshold is determined as the SR of the first priority. On the contrary, the SR of which the period is not less than the period threshold is determined as the SR of the second priority. That is, the period of the SR of the first priority is less than the period threshold, and the period of the SR of the second priority is not less than the period threshold. The period threshold can be set according to work scenarios and work requirements of the UE, and may be determined through network side configuration or in a predefined manner, which is not limited herein.

The priority of the SR can be determined according to the symbol length of the PUCCH of the SR. For example, the SR of which the symbol length of the PUCCH is less than a length threshold is determined as the SR of the first priority, and the SR of which the symbol length of the PUCCH is not less than the length threshold is determined as the SR of the second priority. That is, the symbol length of the PUCCH of the SR of the first priority is less than the length threshold, and the symbol length of the PUCCH of the SR of the second priority is not less than the length threshold. The length threshold can be set according to work scenarios and work requirements of the UE, and may be determined through network side configuration or in a predefined manner, which is not limited herein.

The factors according to which the priority of the SR is determined include but are not limited to the period of the SR and the symbol length of the PUCCH of the SR in the foregoing embodiment, and the priority of the SR can also be determined according to other factors.

Figure 8:
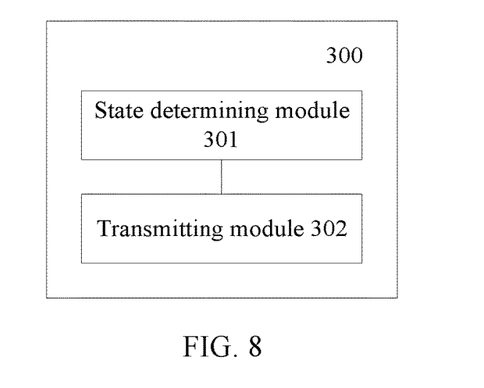
FIG. 8 is a schematic structural diagram of a terminal device according to an embodiment of the present disclosure.

FIG. 8 is a schematic structural diagram of a terminal device according to an embodiment of the present disclosure. As shown in FIG. 8, the terminal device 300 includes a state determining module 301 and a transmission module 302.

The state determining module 301 is configured to: in a case that a PUCCH resource carrying CSI and a PUCCH resource corresponding to an SR overlap in time domain, determine a state of the SR.

The transmission module 302 is configured to: in a case that at least one SR is in a positive state, perform the following processing: skipping transmitting the CSI, and transmitting the SR in the positive state on the PUCCH resource corresponding to the SR in the positive state; or transmitting the SR in the positive state by puncturing the PUCCH resource of the CSI.

According to the embodiments of the present disclosure, in a case that the PUCCH resource carrying the CSI and the PUCCH resource corresponding to the SR overlap in time domain, and at least one SR is in the positive state, the CSI is not transmitted, and the SR in the positive state is transmitted on the PUCCH resource corresponding to the SR in the positive state; or the SR in the positive state is transmitted by puncturing the PUCCH resource of the CSI. It is no longer necessary to multiplex and transmit the SR and the CSI on the PUCCH resource of the CSI to ensure that a network side may receive the SR, that is, decoding or detecting the SR, it is not necessary to receive entire PUCCH of the CSI to obtain the SR via decoding, so as to shorten the transmission latency of the SR and improve the transmission reliability of the SR.

In some examples, the transmission module 302 is further configured to: in a case that all the SRs are in a negative state, skip transmitting the SRs, and transmit the CSI on the PUCCH resource of the CSI.

In some examples, the number of configurations of the SRs is N, and the information bit length of the SRs transmitted by puncturing the PUCCH resource of the CSI is log 2N bits, where N is a positive integer. The number of configurations of the SRs herein is N, indicating that the number of configurations of the SRs of which the PUCCH resources overlap with the PUCCH resource of the CSI in time domain is N.

In some embodiments, SRs have priorities, the priorities include a first priority and a second priority, where the first priority is higher than the second priority.

The transmission module 302 may be configured to: in a case that the at least one SR of the first priority is in the positive state, skip transmitting the CSI, and transmit the SR of the first priority in the positive state on the PUCCH resource corresponding to the SR of the first priority in the positive state.

Alternatively, the transmission module 302 may be configured to: in a case that the at least one SR of the first priority is in the positive state, transmit the SR of the first priority in the positive state by puncturing the PUCCH resource of the CSI.

In some examples, the transmission module 302 is further configured to: in a case that all SRs of the first priority are in a negative state, and the SRs of the second priority exist, multiplex and transmit the SRs of the second priority and the CSI on the PUCCH resource of the CSI.

The number of configurations of the SRs of the second priority is M, or the total number of configurations of the SRs of the first priority and the second priority is M. The information bit length of the SRs of the second priority multiplexed and transmitted on the PUCCH resources of the CSI is $\log_2(1+M)$ bits. M is a positive integer.

The first priority and the second priority in the foregoing embodiments are both configured directly or indirectly by RRC.

In some examples, the period of an SR of a first priority is less than the period threshold.

In some another examples, the symbol length of a PUCCH of an SR of a first priority is less than the length threshold.

The terminal device provided according to the embodiment of the present disclosure may implement processes implemented by the terminal device (such as UE) in the method embodiments of FIG. 1, FIG. 6 and FIG. 7. To avoid repetition, details are not described herein again.

Figure 9:
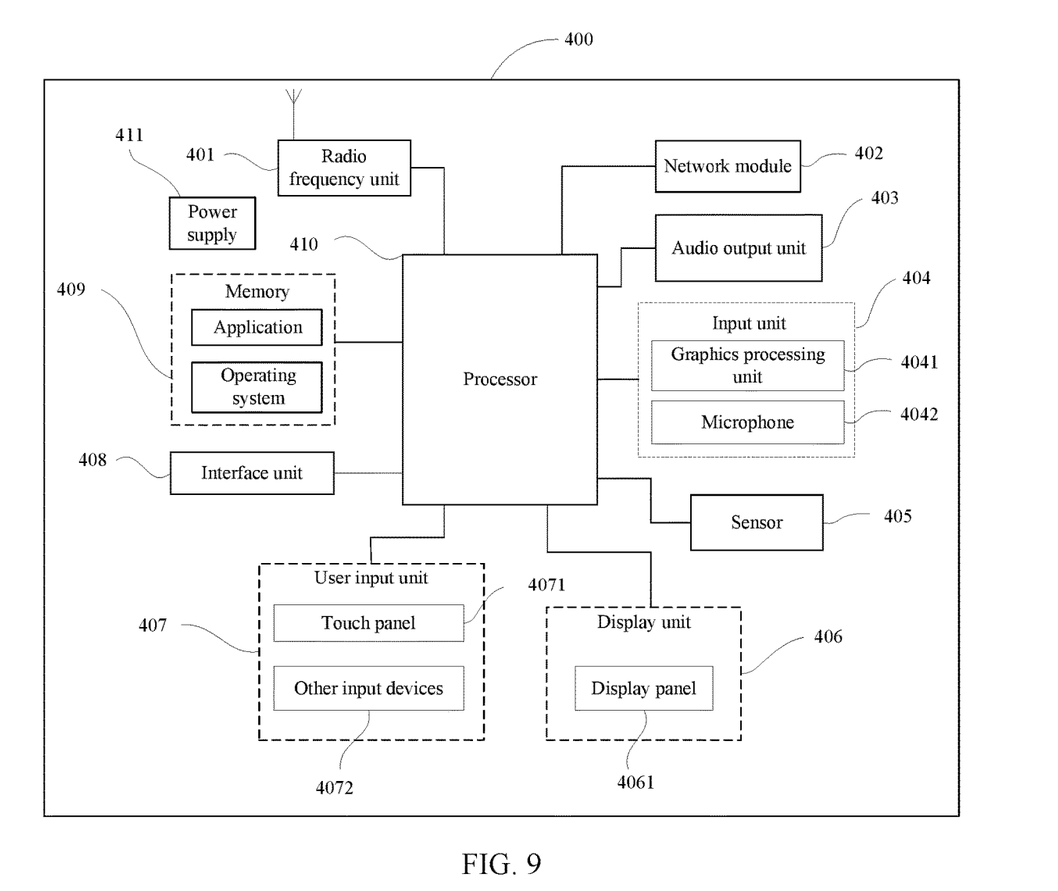
FIG. 9 is a schematic structural diagram of hardware of a terminal device according to the embodiments of the present disclosure.

FIG. 9 is a schematic structural diagram of hardware of a terminal device according to embodiments of the present disclosure. As shown in FIG. 9, the terminal device 400 includes but is not limited to, a radio frequency unit 401, a network module 402, an audio output unit 403, an input unit 404, a sensor 405, a display unit 406, a user input unit 407, an interface unit 408, and a memory 409, a processor 410, a power supply 411, and the like. A person skilled in the art can understand that the structure of the terminal device shown in FIG. 9 does not constitute a limitation to the terminal device. The terminal device may include more or fewer components than those shown in the figure, a combination of some components, or different arrangement of components. According to the embodiment of the present disclosure, the terminal device includes, but is not limited to, a mobile phone, a tablet computer, a notebook computer, a palmtop computer, a vehicle-mounted terminal, a wearable device, a pedometer, or the like.

The processor 410 is configured to: in a case that a PUCCH resource carrying CSI and a PUCCH resource corresponding to an SR overlap in time domain, determine a state of the SR.

The radio frequency unit 401 is configured to: in a case that at least one SR is in a positive state, perform the following processing: skipping transmitting the CSI, and transmitting the SR in the positive state on the PUCCH resource corresponding to the SR in the positive state; or transmitting the SR in the positive state by puncturing the PUCCH resource of the CSI.

According to the embodiments of the present disclosure, in a case that the PUCCH resource carrying the CSI and the PUCCH resource corresponding to the SR overlap in time domain, and at least one SR is in the positive state, the CSI is not transmitted, and the SR in the positive state is transmitted on the PUCCH resource corresponding to the SR in the positive state; or the SR in the positive state is transmitted by puncturing the PUCCH resource of the CSI. It is no longer necessary to multiplex and transmit the SR and the CSI on the PUCCH resource of the CSI to ensure that a network side may receive the SR, that is, decoding or detecting the SR, it is not necessary to receive entire PUCCH of the CSI to obtain the SR via decoding, so as to shorten the transmission latency of the SR and improve the transmission reliability of the SR.

It should be understood that, in this embodiment of the present disclosure, the radio frequency unit 401 may be configured to receive and transmit information, or receive and transmit signals during a call. For example, the radio frequency unit 401 receives downlink data from a base station, and transmits the downlink data to the processor 410 for processing; and in addition, transmits uplink data to the base station. It should be understood that, the radio frequency unit 401 includes, but is not limited to, an antenna, at least one amplifier, a transceiver, a coupler, a low noise amplifier, a duplexer, and the like. In addition, the radio frequency unit 401 may also communicate with a network and another device via a wireless communications system.

The terminal device provides a user with wireless broadband Internet access through the network module 402, for example, helps the user send and receive emails, browse web pages, and access streaming media.

The audio output unit 403 may convert audio data received through the radio frequency unit 401 or the network module 402 or stored in the memory 409 into an audio signal and output the audio signal as a sound. Moreover, the audio output unit 403 may also provide an audio output (such as a receiving sound of a calling signal, a message receiving sound and the like) related to a specific function executed by the terminal device 400. The audio output unit 403 includes a speaker, a buzzer, a telephone receiver, and the like.

The input unit 404 is configured to receive audio or video signals. The input unit 404 may include a graphics processing unit (GPU) 4041 and a microphone 4042. The graphics processing unit 4041 is configured to process image data of a still picture or a video obtained by an image capture apparatus (for example, a camera) in video capture mode or image capture mode. The processed image frame may be displayed on the display unit 406. The image frame processed by the graphics processing unit 4041 may be stored in the memory 409 (or another storage medium) or transmitted via the radio frequency unit 401 or the network module 402. The microphone 4042 may receive a sound and may process such a sound into audio data. The processed audio data may be converted, in a telephone call mode, into a format that may be sent by the radio frequency unit 401 to a mobile communication base station for output.

The terminal device 400 further includes at least one sensor 405, for example an optical sensor, a motion sensor, and other sensors. The optical sensor includes an ambient optical sensor and a proximity sensor. The ambient optical sensor may adjust luminance of the display panel 4061 based on brightness of ambient light. The proximity sensor may turn off the display panel 4061 and/or backlight when the terminal device 400 moves to an ear. As a type of the motion sensor, an accelerometer sensor may detect an acceleration in each direction (generally, three axes), and detect a value and a direction of gravity when the accelerometer sensor is static, and may be used to recognize a terminal device posture (for example screen switching between landscape and portrait modes, a related game, or magnetometer posture calibration), a function related to vibration recognition (for example a pedometer or a knock), and the like. The sensor 405 may further include a fingerprint sensor, a pressure sensor, an iris sensor, a molecular sensor, a gyroscope, a barometer, a hygrometer, a thermometer, and an infrared sensor. Details are not described herein.

The display unit 406 may be configured to display information entered by a user or information provided for the user. The display unit 406 may include a display panel 4061, and the display panel 4061 may be configured in a form of liquid crystal display (LCD), organic light-emitting diode (OLED), or the like.

The user input unit 407 may be configured to receive input digit or character information, and generate a key signal input related to a user setting and function control of the terminal device. The user input unit 407 includes a touch panel 4071 and another input device 4072. The touch panel 4071 is also referred to as a touchscreen, and may collect a touch operation performed by a user on or near the touch panel 4071 (for example an operation performed by a user on the touch panel 4071 or near the touch panel 4071 by using any proper object or accessory, such as a finger or a stylus). The touch panel 4071 may include two parts: a touch detection device and a touch controller. The touch detection device detects a touch position of a user, detects a signal brought by a touch operation, and transmits the signal to the touch controller. The touch controller receives touch information from the touch detection device, converts the touch information into contact coordinates, sends the contact coordinates to the processor 410, and receives and executes a command from the processor 410. In addition, the touch panel 4071 may be implemented in various forms, such as a resistance type, a capacitance type, an infrared ray and a surface acoustic wave. In addition to the touch panel 4071, the user input unit 407 may further include another input device 4072. Other input devices 4072 may include but are not limited to at least one of a physical keyboard, a functional button (such as a volume control button or a power on/off button), a trackball, a mouse, and a joystick. Details are not described herein.

Optionally, the touch panel 4071 may cover the display panel 4061. When detecting the touch operation on or near the touch panel 4071, the touch panel 4071 transmits the touch operation to the processor 410 to determine a type of a touch event, and then the processor 410 provides corresponding visual output on the display panel 4061 based on the type of the touch event. In FIG. 9, the touch panel 4071 and the display panel 4061 are configured as two independent components to implement input and output functions of the terminal device, but in some embodiments, the touch panel 4071 and the display panel 4061 may be integrated to implement the input and output functions of the terminal device. Details are not limited herein.

The interface unit 408 is an interface for connecting an external apparatus to the terminal device 400. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 408 may be configured to receive an input (for example, data information or power) from the external apparatus and transmit the received input to one or more elements in the terminal device 400, or transmit data between the terminal device 400 and the external device.

The memory 409 may be configured to store a software program and various data. The memory 409 may mainly include a program storage area and a data storage area. The program storage area may store an operating system, an application program required by at least one function (for example, an audio playing function and an image playing function), and the like. The data storage area may store data (for example, audio data and an address book) created according to use of the mobile phone. In addition, the memory 409 may include a high-speed random access memory, and may further include a nonvolatile memory, for example, at least one disk storage device, a flash memory, or another volatile solid-state storage device.

The processor 410 is a control center of the terminal. The processor 410 uses various interfaces and lines to connect the various parts of the entire terminal device, and performs various functions of the terminal device and processes data by running or executing software programs and/or modules stored in the memory 409 and invoking data stored in the memory 409, so as to monitor the terminal device as a whole. The processor 410 can include one or more processing units. Preferably, the processor 410 can be integrated with an application processor and a modem processor. The application processor mainly processes the operating system, the user interface, applications, etc. The modem processor mainly processes wireless communication. It may be understood that alternatively, the modem processor may not be integrated into the processor 410.

The terminal device 400 may further include the power supply 411 (such as a battery) supplying power to each component. Preferably, the power supply 411 may be logically connected to the processor 410 by using a power management system, so as to implement functions such as charging management, discharging management and power consumption management by using the power management system.

In addition, the terminal device 400 includes some function modules not shown, and details are not described herein.

An embodiment of the present disclosure further provides a non-transitory computer-readable storage medium, with a computer program stored thereon, where when the computer program is executed by a processor, the processes of the embodiment of the foregoing uplink control information transmission method are implemented, with the same technical effects achieved. To avoid repetition, details are not described again herein. The non-transitory computer-readable storage medium is, for example, a read-only memory (ROM), a random access memory (RAM), a magnetic disk, or an optical disc.

The embodiments in this specification are described in a progressive manner, and that the same or similar parts among the embodiments can be referred to each other. Each embodiment focuses on the differences from other embodiments. For related parts of embodiments of the terminal device embodiments of the non-transitory computer-readable storage medium, refer to the illustration section of the method embodiment.

It should be noted that in this specification, the terms "comprise", "include" and any other variants thereof are intended to cover non-exclusive inclusion, so that a process, a method, an article, or a device that includes a series of elements not only includes these very elements, but may also include other elements not expressly listed, or also include elements inherent to this process, method, article, or device. An element limited by "includes a . . . " does not, without more constraints, preclude the presence of additional identical elements in the process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network side device, or the like) to perform the methods described in the embodiments of the present disclosure.

All aspects of the present disclosure are described above with reference to a flowchart and/or block diagram of a method, a device (system), and a machine program product according to embodiments of the present disclosure. It should be understood that each block in the flowcharts and/or block diagrams, and a combination of blocks in the flowcharts and/or block diagrams may be implemented by programs or instructions. Those programs or instructions may be provided for a general-purpose computer, a dedicated computer, or a processor of any other programmable data processing device to generate a machine, so that the functions/actions specified in one or more blocks in the flowcharts and/or block diagrams may be implemented via the those programs or instructions executed by the computer or any other programmable data processing device. This processor may be, but is not limited to, a general-purpose processor, a dedicated processor, an application specific processor or a field-programmable logical circuit. It may be understood that each block in the flowcharts and/or block diagrams and combinations of the blocks in the flowcharts and/or block diagrams may also be implemented by dedicated hardware executing specified functions or actions, or may be implemented by a combination of dedicated hardware and computer instructions.

The embodiments of the present disclosure are described above with reference to the accompanying drawings. However, the present disclosure is not limited to the foregoing specific implementations. The foregoing specific implementations are merely exemplary, but are not limitative. Under the enlightenment of the present disclosure, a person of ordinary skill in the art may make many forms without departing from the objective and scope of the claims of the present disclosure, and all of which fall within the protection of the present disclosure.

What is claimed is:

1. An uplink control information transmission method, applied to a terminal device and comprising:
   in a case that a physical uplink control channel (PUCCH) resource carrying channel state information (CSI) and a PUCCH resource corresponding to a scheduling request (SR) overlap in time domain, determining a state of the SR; and
   in a case that at least one SR is in a positive state, performing following processing:
   skipping transmitting the CSI, and transmitting an SR in the positive state on the PUCCH resource corresponding to the SR in the positive state; or
   transmitting the SR in the positive state by puncturing the PUCCH resource of the CSI; wherein
   SRs have priorities, the priorities comprise a first priority and a second priority, and the first priority is higher than the second priority; and the method further comprising:
   in a case that all the SRs of the first priority are in a negative state, and SRs of the second priority exist, multiplexing and transmitting the SRs of the second priority and the CSI on the PUCCH resource of the CSI.

2. The method according to claim 1, further comprising:
   in a case that all SRs are in the negative state, skipping transmitting the SRs, and transmitting the CSI on the PUCCH resource of the CSI.

3. The method according to claim 1, wherein
   in the case that at least one SR is in a positive state, the skipping transmitting the CSI, and transmitting an SR in the positive state on the PUCCH resource corresponding to the SR in the positive state comprises:
   in a case that at least one SR of the first priority is in the positive state, skipping transmitting the CSI, and transmitting SR of the first priority in the positive state on the PUCCH resource corresponding to the SR of the first priority in the positive state.

4. The method according to claim 1, wherein
   in the case that at least one SR is in a positive state, the transmitting the SR in the positive state by puncturing the PUCCH resource of the CSI comprises:
   in a case that at least one SR of the first priority is in the positive state, transmitting SR of the first priority in the positive state by puncturing the PUCCH resource of the CSI.

5. The method according to claim 1, wherein a number of configurations of the SRs of the second priority is M, and M is a positive integer; and
   the information bit length of the SRs of the second priority multiplexed and transmitted on the PUCCH resources of the CSI is log 2(1+M) bits.

6. The method according to claim 1, wherein the first priority and the second priority are both configured directly or indirectly by radio resource control (RRC).

7. The method according to claim 1, wherein
   a period of SR of the first priority is less than a period threshold; and/or
   a symbol length of a PUCCH of an SR of the first priority is less than a length threshold.

8. A terminal device, comprising: a processor, a memory, and a computer program stored in the memory and executable on the processor, wherein the computer program, when executed by the processor, causes the terminal device to perform:
   in a case that a physical uplink control channel (PUCCH) resource carrying channel state information (CSI) and a PUCCH resource corresponding to a scheduling request (SR) overlap in time domain, determining a state of the SR; and
   in a case that at least one SR is in a positive state, performing following processing:
   skipping transmitting the CSI, and transmitting an SR in the positive state on the PUCCH resource corresponding to the SR in the positive state; or
   transmitting the SR in the positive state by puncturing the PUCCH resource of the CSI; wherein
   SRs have priorities, the priorities comprise a first priority and a second priority, and the first priority is higher than the second priority; and
   the computer program, when executed by the processor, causes the terminal device to further perform:
   in a case that all the SRs of the first priority are in a negative state, and SRs of the second priority exist, multiplexing and transmitting the SRs of the second priority and the CSI on the PUCCH resource of the CSI.

9. The terminal device according to claim 8, wherein the computer program, when executed by the processor, causes the terminal device to further perform:
   in a case that all SRs are in the negative state, skipping transmitting the SRs, and transmitting the CSI on the PUCCH resource of the CSI.

10. The terminal device according to claim 8, wherein
    the computer program, when executed by the processor, causes the terminal device to perform:
    in a case that at least one SR of the first priority is in the positive state, skipping transmitting the CSI, and transmitting SR of the first priority in the positive state on the PUCCH resource corresponding to the SR of the first priority in the positive state.

11. The terminal device according to claim 8, wherein a number of configurations of the SRs of the second priority is M, and M is a positive integer; and
    the information bit length of the SRs of the second priority multiplexed and transmitted on the PUCCH resources of the CSI is log 2(1+M) bits.

12. The terminal device according to claim 8, wherein the first priority and the second priority are both configured directly or indirectly by radio resource control (RRC).

13. A non-transitory computer-readable storage medium, wherein the non-transitory computer-readable storage medium stores a computer program, and the computer program, when executed by a processor of a terminal device, causes the terminal device to perform:

in a case that a physical uplink control channel (PUCCH) resource carrying channel state information (CSI) and a PUCCH resource corresponding to a scheduling request (SR) overlap in time domain, determining a state of the SR; and in a case that at least one SR is in a positive state, performing following processing:

skipping transmitting the CSI, and transmitting an SR in the positive state on the PUCCH resource corresponding to the SR in the positive state; or transmitting the SR in the positive state by puncturing the PUCCH resource of the CSI; wherein SRs have priorities, the priorities comprise a first priority and a second priority, and the first priority is higher than the second priority; and the computer program, when executed by the processor, causes the terminal device to further perform:

in a case that all the SRs of the first priority are in a negative state, and SRs of the second priority exist, multiplexing and transmitting the SRs of the second priority and the CSI on the PUCCH resource of the CSI.

14. The non-transitory computer-readable storage medium according to claim 13, wherein the computer program, when executed by the processor, causes the terminal device to further perform:

in a case that all SRs are in the negative state, skipping transmitting the SRs, and transmitting the CSI on the PUCCH resource of the CSI.

15. The non-transitory computer-readable storage medium according to claim 13, wherein the computer program, when executed by the processor, causes the terminal device to perform:

in a case that at least one SR of the first priority is in the positive state, skipping transmitting the CSI, and transmitting SR of the first priority in the positive state on the PUCCH resource corresponding to the SR of the first priority in the positive state.

16. The non-transitory computer-readable storage medium according to claim 13, wherein a number of configurations of the SRs of the second priority is M, and M is a positive integer; and the information bit length of the SRs of the second priority multiplexed and transmitted on the PUCCH resources of the CSI is $\log 2(1+M)$ bits.

17. The non-transitory computer-readable storage medium according to claim 13, wherein the first priority and the second priority are both configured directly or indirectly by radio resource control (RRC).

18. The non-transitory computer-readable storage medium according to claim 13, wherein the computer program, when executed by the processor, causes the terminal device to perform:

in a case that at least one SR of the first priority is in the positive state, transmitting SR of the first priority in the positive state by puncturing the PUCCH resource of the CSI.

19. The terminal device according to claim 8, wherein the computer program, when executed by the processor, causes the terminal device to perform:

in a case that at least one SR of the first priority is in the positive state, transmitting SR of the first priority in the positive state by puncturing the PUCCH resource of the CSI.

20. The terminal device according to claim 8, wherein a period of SR of the first priority is less than a period threshold; and/or a symbol length of a PUCCH of an SR of the first priority is less than a length threshold.

* * * * *